US006802647B2

United States Patent
Hausberger et al.

(10) Patent No.: US 6,802,647 B2
(45) Date of Patent: Oct. 12, 2004

(54) LINEAR ROLLING BEARING

(75) Inventors: Franziska Hausberger, Saarbrucken (DE); Thomas Winkler, Sulzbach (DE); Martin Menges, Homburg (DE)

(73) Assignee: INA-Schaeffler KG (DE)

( * ) Notice: Subject to any disclaimer, the term of this patent is extended or adjusted under 35 U.S.C. 154(b) by 51 days.

(21) Appl. No.: 10/382,893

(22) Filed: Mar. 6, 2003

(65) Prior Publication Data

US 2003/0231812 A1 Dec. 18, 2003

(30) Foreign Application Priority Data

Mar. 7, 2002 (DE) .......................................... 102 10 053

(51) Int. Cl.⁷ .............................................. F16C 29/06
(52) U.S. Cl. ....................................................... 384/45
(58) Field of Search .............................. 384/43, 44, 45; 464/168

(56) References Cited

FOREIGN PATENT DOCUMENTS

| DE | 8602881 | 4/1986 |
|---|---|---|
| DE | 8625602 | 12/1986 |
| DE | 8914085 | 2/1990 |
| DE | 19957110 | 5/2001 |
| EP | 0846880 | 6/1998 |
| EP | 0890755 | 1/1999 |
| JP | 11002241 | 1/1999 |
| JP | 2000314420 | 11/2000 |

*Primary Examiner*—Lenard A. Footland
(74) *Attorney, Agent, or Firm*—Muserlian, Lucas and Mercanti

(57) ABSTRACT

A linear rolling bearing comprises a guide carriage (1) that can be mounted on a guide rail (2) through rolling elements (5). The guide carriage (1) comprises at least one endless rolling element channel (3) for the rolling elements (5). The rolling element channel (3) comprises a load-bearing channel (4) for load-bearing rolling elements (5), a return channel (6) for returning rolling elements (5) and deflecting channels (7) arranged at both ends of the load-bearing channel (4) and the return channel (6), which deflecting channels (7) connect the load-bearing channel (4) and the return channel (6) endlessly to each other and deflect the rolling elements (5) out of the return channel (6) into the load-bearing channel (4), and vice versa. The rolling elements (5) are received in pockets (8) of a cage strip (9) having at least two free ends (13, 14). The cage strip (9) comprises spacers (10) that define the cage pockets (8) and are arranged, as seen in circulating direction, between successive rolling elements (5). The cage strip (9) further comprises cage belts (11) arranged on both sides of the rolling element row to connect the spacers (10) to one another. The cage belts (11) are received in guide channels (12) of the rolling element channel (3) for guiding the cage strip (9) in the rolling element channel (3). Adjacent free ends (13, 14) of the cage strip (9) comprise movable legs (15, 16, 22, 23, 27, 31) that are arranged substantially crosswise to the cage strip (9), and opposing end surfaces of the legs (15, 16, 22, 23, 27, 31) are configured as contact surfaces (17, 18, 24, 25, 28) for the legs (15, 16, 22, 23, 27, 31) with each other.

17 Claims, 3 Drawing Sheets

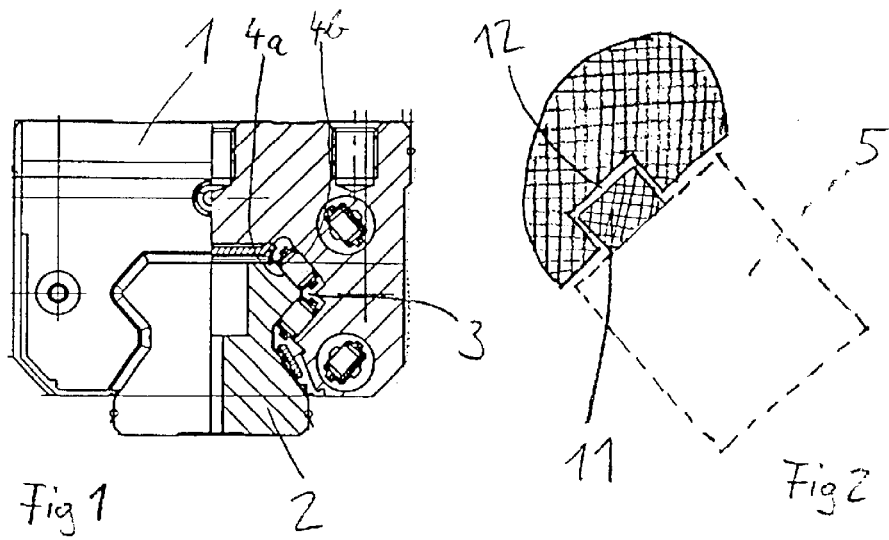
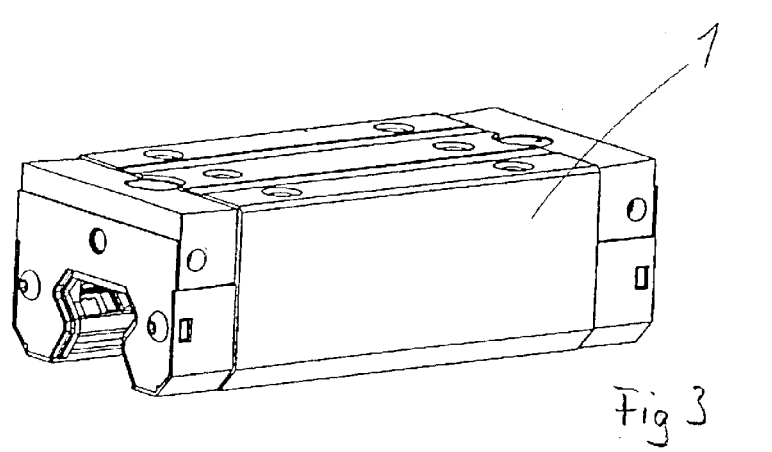
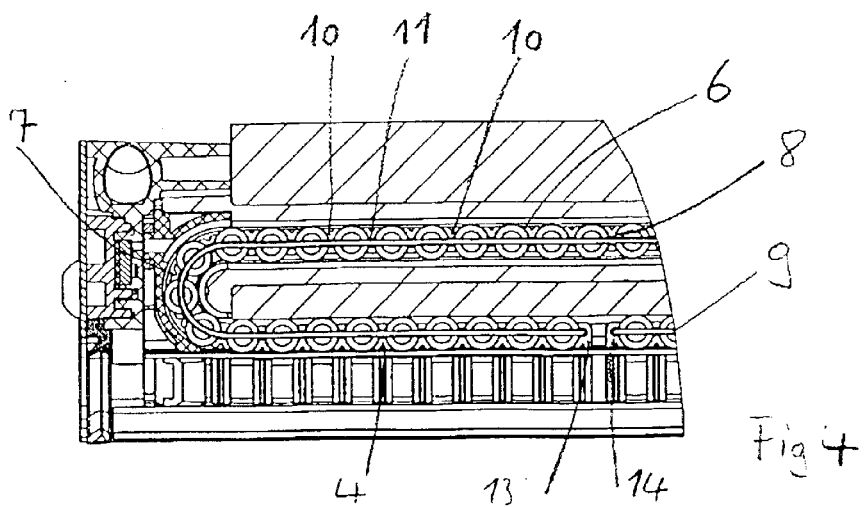

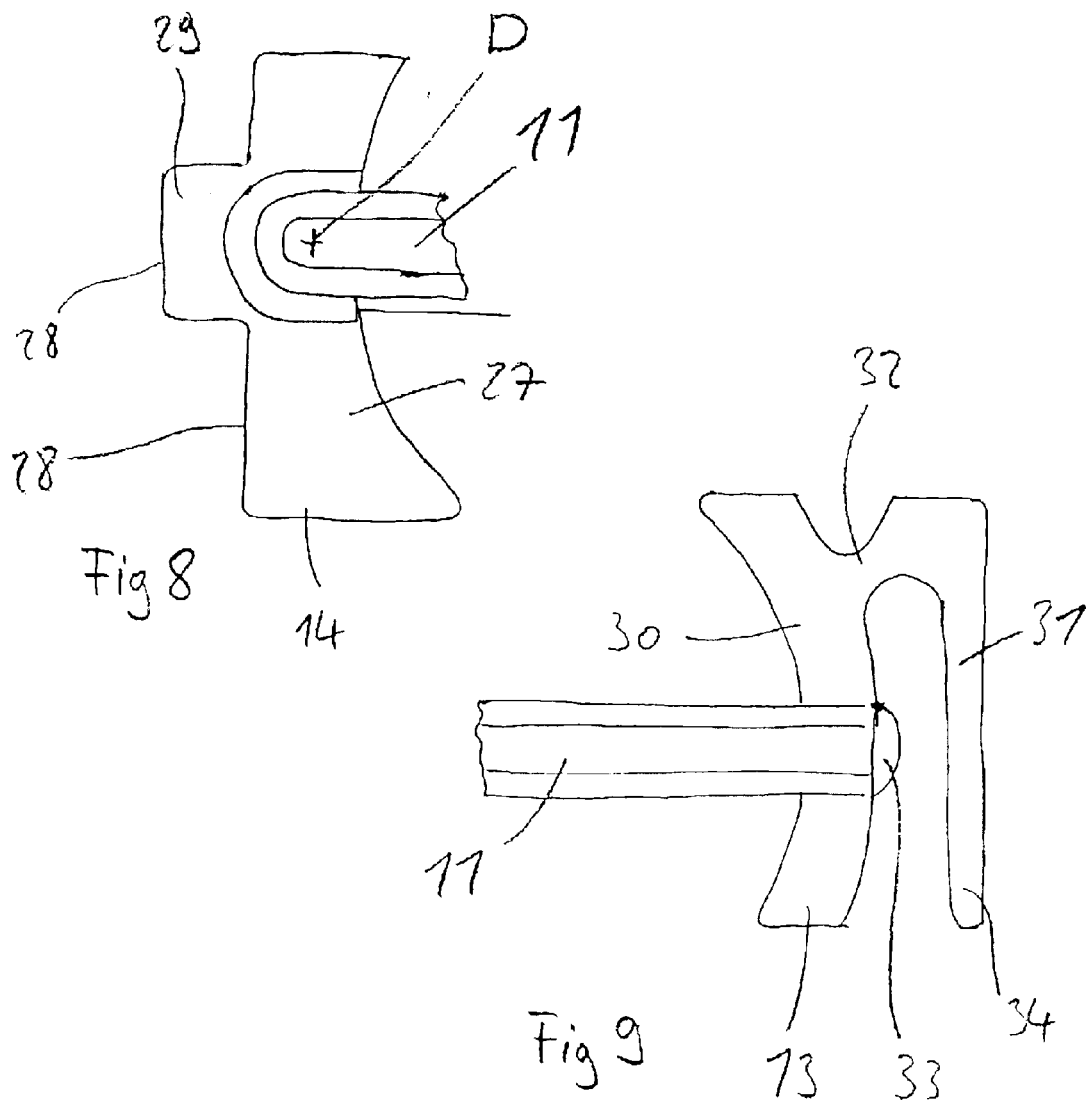

LINEAR ROLLING BEARING

FIELD OF THE INVENTION

The present invention concerns a linear rolling bearing comprising a guide carriage that can be mounted through rolling elements on a guide rail. Linear rolling bearings of this type are used, for example, in the construction of machine tools in which a tool or a work-piece, for instance, is fixed on the guide carriage for moving along the guide rail.

BACKGROUND OF THE INVENTION

One such linear rolling bearing is known, for example, from EP 0 846 880 A1. The guide carriage of this bearing comprises at least one endless channel for rolling elements. This rolling element channel comprises a load-bearing channel for load-bearing rolling elements, a return channel for returning rolling elements and, at both ends of the load-bearing channel and the return channel, a deflecting channel which connects these channels endlessly and deflects the rolling elements out of the return channel into the load-bearing channel and vice versa. The rolling elements are received in pockets of a cage strip having two free ends. As seen in circulating direction, the cage strip comprises spacers arranged between successive rolling elements, and cage belts arranged on both sides of the row of rolling elements connect the spacers to one another, the cage belts being received in guide channels of the rolling element channel for guiding the cage strip in the rolling element channel. The guide channel is formed by an open groove. During the operation of the linear rolling bearing, the ball chain circulates endlessly in the rolling element channel, the balls rolling on raceways formed on the rail and the guide carriage. The cage strip is deflected out of its longitudinally stretched position into a curved path when it leaves the load-bearing channel or the return channel and enters the deflecting channel. To prevent the free ends of the cage strip from tilting when they are deflected out of the longitudinal direction into the curved path, the cage belts are rounded off, so that an assumed center point axis of this rounding is perpendicular to the longitudinally stretched cage belt. The rounded-off cage belts end in a common spacer. The free ends of the cage strip consequently have a conical taper.

Over its operative life, the cage strip can get deformed as a result of mechanical loading, temperature influences, wear etc. This deformation can lead to an elongation of the cage strip. This means that the adjacent free ends of the cage strip can come into contact with each other. Especially when one of the two free ends of the cage has already entered the deflecting channel, while the other free end is still in the load-bearing or the return channel, these two adjacent free ends are in a slanting position to each other. In case of a contact between these two free ends, they can get hooked to each other because these tapered free ends describe together with the laterally entering cage strips, a canted contour that favors this hooking. Such a hooking of the free cage ends to each other can, however, lead to blocking and thus to failure and destruction of the linear rolling bearing.

OBJECTS OF THE INVENTION

It is an object of the invention to provide an improved linear rolling bearing of the pre-cited type in which the free ends of the cage strip are flawlessly guided and a contact between the adjacent free ends of the cage does not interfere with the perfect circulation of the cage strip.

This and other objects and advantages of the invention will become obvious from the following detailed description.

SUMMARY OF THE INVENTION

The invention achieves the above objects by the fact that each of the two adjacent free ends of the cage strip has a movable leg that is arranged substantially crosswise to the cage strip, and opposing end surfaces of the legs are configured as contact surfaces for the legs with each other. When, as in the situation described above, one of the free cage ends has already entered the deflecting channel, while the adjacent free end of the cage strip is still in the load-bearing channel or in the return channel, the two legs of the two free ends can come into contact with each other. Due to the fact that the legs are arranged crosswise to the cage strip, they define a wedge-shaped gap between them in this situation. A contact between the two legs therefore takes place below the cage belts. Under this contact, the legs deflect i.e., they right themselves to each other. The point of contact between the legs thus shifts toward the cage belt, so that a pressure force between the abutting contact surfaces, as far as it is effective, is transmitted at the level of the cage belts. In other words, any occurring pressure force is transmitted into the neutral fiber of the cage strip, so that no undesired forces are introduced crosswise to the cage belt. The contact surfaces are preferably made smooth and flat. But they may also be smooth and have a slightly curved contour, in which case, an assumed center point axis of this curved contour is arranged crosswise to the direction of circulation of the rolling elements and perpendicular to a plane in which the rolling elements circulate. The flawless circulation of the cage strip can also be supported by rounding off the ends of the cage belts, with an assumed center point axis of this rounding being arranged crosswise to the direction of circulation of the rolling elements and perpendicular to a plane in which the rolling elements circulate. Such roundings on spacers are known, per se, for example, from JP 63-123824 U1.

The legs are preferably arranged within a cross-sectional opening defined by the rolling element channel and outside of the aforesaid guide channels. If rollers are used as rolling elements, it is particularly advantageous if the leg substantially fills the cross-sectional opening of the rolling element channel. This means that, as seen in circulating direction of the rolling elements, the leg describes a substantially rectangular or square contour. In any case, the leg spans within the rolling element channel a sufficiently large surface that is dimensioned so that a hooking of the adjacent legs into each other and a deflection of the legs is not possible. If the leg is unsupported, the required mobility can be achieved by making the leg with thin walls out of a flexible plastic, so that the free ends of the leg can be deflected without the need of noteworthy forces. The leg preferably has a plate-like configuration, the front end surface of the leg oriented away from the free end of the cage strip being flat. If adjacent, plate-like legs come into contact with each other, a sliding movement takes place between the abutting contact surfaces of the legs which excludes the possibility of tilting or hooking.

The leg is preferably formed integrally on the spacer and/or on the cage belts at the level of the cage belt and extends from there in the direction of a space axis arranged perpendicular to the underside of the cage belt. Because, as mentioned above, the legs are movable and right themselves to each other, the transmission of any pressure force occurring between the contact surfaces takes place only at the level of the belt i.e., in the neutral fiber, without any forces acting crosswise to the direction of circulation on the cage strip. A perfect guidance of the cage strip is thus guaranteed.

It may be of advantage in certain uses if the leg additionally extends in the direction of a space axis arranged perpendicular to the upper side of the cage belt i.e., if it has a T-shaped configuration. This feature of the invention offers the advantage that the cage strip can be inserted into the linear rolling bearing without attention having to be paid to the underside or the upper side of the cage strip.

The mobility of the leg proposed by the invention can also be achieved with the help of an articulation connecting the leg to the spacer and/or the two cage belts. In this case, the leg itself can be made of a rigid material. This articulation can be made, for example, as a film joint which can be provided already in the injection molding die so that it is of a technically simple nature and economically interesting. Similar to a film joint, it is also possible to use an elastically deflectable web that is connected on one side to the leg and on the other side to the spacer and/or the two cage belts. This embodiment of the invention is likewise particularly suitable for the fabrication of the cage strip by injection molding.

The leg and the articulation can be made in one piece with the spacer or the two cage belts. This embodiment, too, is particularly suitable for an injection molding method in which the cage strip is made of plastic.

In place of an articulation, the leg itself can have a flexible configuration. This is possible if the leg is made with thin walls out of a flexible plastic.

The part to which the leg is connected can be a spacer but may also have another configuration.

To assure that any pressure force occurring between the two abutting cage ends is transmitted at the level of the cage belt, the leg may comprise a projection forming a part of the contact surface at the level of the cage belt. When the free ends of the cage strip contact each other below the cage belt and then right themselves to each other, further contact takes place at these projecting portions so that it is assured that the transmission of pressure force is effected at the level of the cage belt.

The invention will now be described more closely with reference to four examples of embodiment illustrated in a total of nine appended figures.

BRIEF DESCRIPTION OF THE DRAWINGS

FIG. 1 shows a cross-section through a linear rolling bearing of the invention,

FIG. 2 shows a detail of FIG. 1 in an enlarged representation,

FIG. 3 is a perspective representation of the guide carriage of the linear rolling bearing of the invention, FIG. 4 shows a longitudinal section through the linear rolling bearing, FIG. 8 shows a modified free end of the cage strip, and FIG. 9 shows a further modified free end of the cage strip.

DETAILED DESCRIPTION OF THE DRAWINGS

Figure 5:
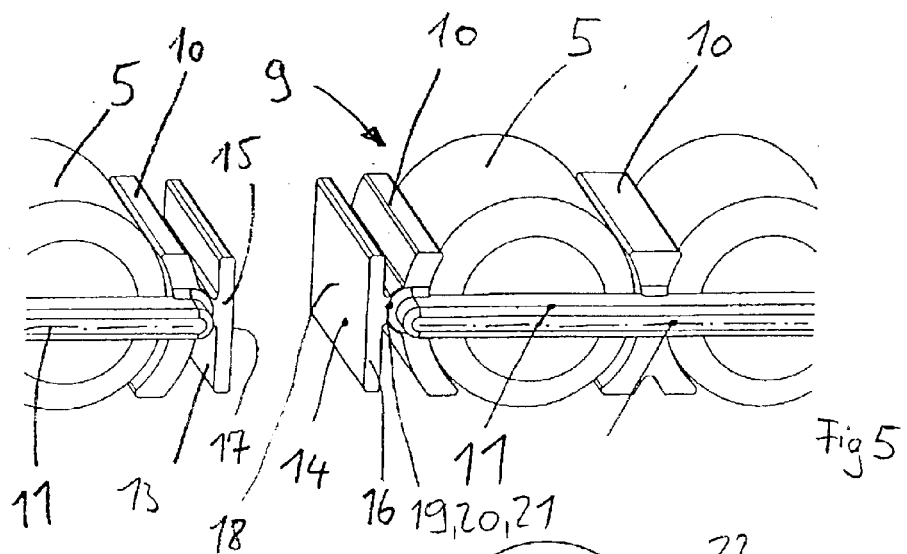
FIG. 5 is a perspective representation of the cage strip.

FIGS. 1 and 4 show the structure of a linear rolling bearing of the invention. A guide carriage 1 is mounted on a guide rail 2 through rolling elements. The guide carriage 1 comprises four endless rolling element channels 3 that form two pairs. The two endless rolling element channels 3 of a pair are situated vertically on top of each other. The two pairs of rolling element channels 3 are arranged in mirror symmetry to the central longitudinal axis of the guide rail 2. The rolling element channel 3 comprises a load-bearing channel 4 for load-bearing rollers 5, a return channel 6 for returning rollers 5 and, at both ends of the load-bearing channel 4 and the return channel 6, a deflecting channel 7 that connects these channels endlessly to each other to deflect the rollers 5 out of the return channel 6 into the load-bearing channel 4, and vice versa. In the load-bearing channel 4 the rollers 5 are in rolling contact with parallel raceways 4a, 4b, one of the raceways 4a being configured on the guide rail 2 and the other raceway 4b on the guide carriage 1. The rollers 5 are received in pockets 8 of a cage strip 9 comprising spacers 10 that define the cage pockets 8 and, as seen in circulating direction, are arranged behind one another. Cage belts 11 made integrally with the spacers 10 are arranged on both sides of the rollers 5 while being guided in guide channels 12 of the rolling element channel 3. As shown in FIG. 4, the cage strip 9 comprises two free ends 13, 14.

The special configuration of these free ends 13, 14 will now be described more closely with reference to FIGS. 5 to 9.

FIG. 5 shows a cage strip 9 of the invention having free ends 13 and 14 that are arranged next to each other in opposing relationship. Each of the free ends 13, 14 comprises a movable leg 15, 16 that is arranged substantially crosswise to the cage strip 9, and the legs 15 and 16 comprise opposing contact surfaces 17 and 18 respectively, for each other.

The legs 15, 16 have a plate-like configuration, and a front end surface of each leg 15, 16 oriented away from the free end of the cage strip 9 is flat. In other words, the two opposing contact surfaces 17 and 18 have a flat configuration. The legs 15, 16 are formed integrally on the respective last spacer 10, approximately at the level of the cage belt 11. As viewed from the cage belt 11, the legs extend in the directions of a space axis arranged perpendicular to the underside of the cage belt and of a space axis arranged perpendicular to the upper side of the cage belt.

Each leg 15, 16 is formed integrally on the respective last spacer 10 through an articulation 19. The articulation 19 is formed in the present embodiment by an elastically deflectable web 20 that is formed integrally on one side on the leg 15, 16, and on the other side on the spacer 10. The web 20 can be made with thin walls so that a film joint 21 is formed. In any case, the articulation 19 is configured so that the leg 15, 16 can pivot about an axis that extends crosswise to the circulating direction and parallel to the raceways with which the rollers 5 are in rolling contact.

Figure 6:
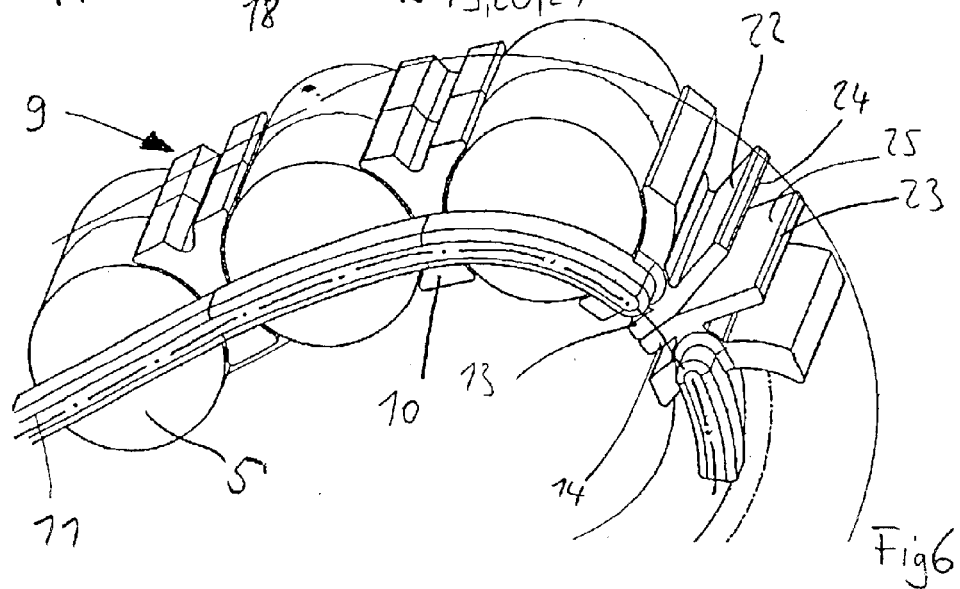
FIG. 6 is a perspective representation of a modified cage strip.

FIG. 6 shows a modification of the cage strip of FIG. 5. The main difference to the cage strip of FIG. 5 is that the free ends 13, 14 of the cage strip 9 merge into plate-shaped legs 22, 23 that are made thin-walled out of plastic and are in themselves flexible. It can be seen from this figure that the contact surfaces 24, 25 of the two legs 22, 23 abut against each other. The first contact between the contact surfaces 24, 25 is made below the cage belt 11. This is due to the fact that the figure shows the two free cage ends 13, 14 as situated in the region of the deflecting channel 7, not shown. Due to their flexible configuration, the legs 22, 23 yield elastically when they contact each other so that the point of contact shifts upwards up to the level of the cage belt 11. This is the situation shown in FIG. 6. It can be seen that the legs 22, 23 are deflected below the cage strip 11 where they are made integrally on the spacers 10 so that when the point of contact is at the level of the cage strip 11, any pressure forces effective in the circulating direction are introduced into the neutral fiber of the cage strip 11. As a result, no undesired forces that would cause undesired friction in the guide channel occur crosswise to the cage belt 11.

Figure 7:
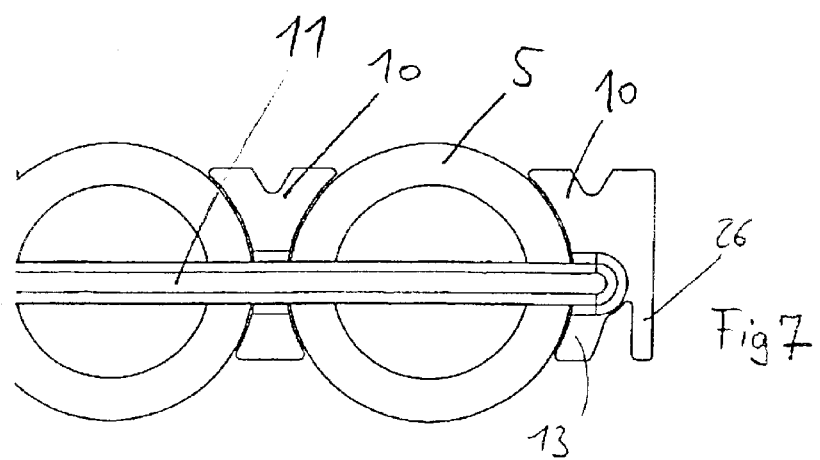
FIG. 7 is a side view of a modified cage strip of the invention.

FIG. 7 shows a cage strip 9. For the sake of simplicity, only one of the free ends is illustrated. On this free end 13, a leg 26 is formed integrally on the spacer 10 approximately at the level of the cage belt 11 and extends in the direction of a space axis arranged perpendicular to the underside of the cage belt. This leg 26 likewise has a flexible configuration so that the same effects are achieved here, too, as described above in connection with FIG. 6.

FIG. 8 shows the free end 14 of a cage strip, not shown. This free end 14 comprises a leg 27 that is formed integrally on both cage belts 11 approximately at the level of the cage belt 11. In this embodiment, the leg 27 at the same time forms a spacer in so far as a rolling element, not shown, is arranged in a pocket defined by this leg 27. The leg 27 is arranged for pivoting about an axis of pivot D that extends at the center of the belt height crosswise to the circulating direction and parallel to the raceway of the rollers 5. On the front end of the leg 27 opposing the adjacent leg, not shown, a contact surface 28 is likewise formed but a part of this contact surface 28 is constituted by a raised portion in the form of a projection 29. When this inventive cage strip circulates in the linear rolling bearing and both the free ends enter the deflecting channel, the two legs 27 come into contact with each other at first through those of their parts that are situated below the cage belt 11 in FIG. 8. Because, upon contact, both legs 27 pivot about their axes of pivot D, the contact surfaces 28 now contact each other in the region of the projections 29. These projections 29 therefore guarantee that any forces occurring in the direction of circulation are transmitted in the neutral fiber at the level of the cage belt. This assures that no undesired forces become effective crosswise to the cage belt 11.

FIG. 9 shows the free end 13 of a cage strip, not represented. A web 30 defining a cage pocket is made integrally on both cage belts 11. The web 30 extends away from the cage belt 11 in the direction of a space axis arranged perpendicular to the underside of the cage belt and of a space axis arranged perpendicular to the upper side of the cage belt. A leg 31 is integrally formed on the upper free end of the web 30. This leg 31 is integrally connected to the web 30 through an articulation 32 and extends beyond the underside of the belt. This articulation 32 is made as a flexible, thin-walled connecting part. Further, on its side opposing the leg 31, the web 30 comprises a projection 33. Within the linear rolling bearing, as already described above, the first contact between the two adjacent legs 31 takes place in the region of the free ends 34 of the legs. Under this contact, the legs 31 deflect and the point of contact shifts towards the other end of the leg opposite the free end 34 till the leg 31 comes to bear against the projection 33. Thus, in this situation, too, it is assured that any pressure forces effective in circulating direction are transmitted at the level of the cage belt 11.

In all the examples of embodiment represented here, the legs are movable so that a pressure force between abutting contact surfaces is transmitted at the level of the cage belts. Further, the legs in all the examples of embodiment are arranged within a cross-sectional opening defined by the rolling element channel and outside of the guide channels. Further, in all the examples of embodiment, the legs are unsupported The cage strip of all the examples of embodiment may be made up of a plurality of segments each of which has two free ends.

What is claimed is:

1. A linear rolling bearing comprising a guide carriage that can be mounted on a guide rail through rolling elements, said guide carriage comprising at least one endless rolling element channel for the rolling elements, said rolling element channel comprising a load-bearing channel for load-bearing rolling elements, a return channel for returning elements and deflecting channels arranged at two ends of the load-bearing channel and the return channel, which deflecting channels connect the load-bearing channel and the return channel endlessly to each other and deflect the rolling elements out of the return channel into the load-bearing channel, and vice versa, the rolling elements being received in pockets of a cage strip comprising at least two free ends, said cage strip further comprising spacers that define the pockets and are arranged, as seen in circulating direction, between successive rolling elements, said cage strip further comprising cage belts arranged on both sides of the rolling element row to connect the spacers to one another, the cage belts being received in guide channels of the rolling element channel for guiding the cage strip in the rolling element channel, wherein the free ends of the cage strip are adjacent to each other, and each of these adjacent free ends comprises a movable leg that is arranged substantially crosswise to the cage strip, and opposing end surfaces of the legs are configured as contact surfaces for the legs with each other.

2. A linear rolling bearing of claim 1, wherein the legs are movable so that a pressure force occurring between the contact surfaces in abutting relationship is transmitted at a level of the cage belts.

3. A linear rolling bearing of claim 1 wherein the leg is arranged within a cross-sectional opening defined by the rolling element channel, and outside of the guide channels.

4. A cage strip of claim 3, wherein the leg substantially fills the cross-sectional opening of the rolling element channel.

5. A cage strip of claim 1, wherein, as seen in longitudinal direction of the cage strip, the leg spans a surface arranged within a projected area of the rolling elements.

6. A cage strip of claim 1, wherein the leg is unsupported.

7. A cage strip of claim 1, wherein the leg has a plate-like configuration, and an end surface of the leg oriented away from the free end of the cage strip is flat.

8. A cage strip of claim 1, wherein the leg is formed at a level of the cage belts integrally on one of: the spacer, the two cage belts, or the spacer and the two cage belts, and extends in direction of a space axis arranged perpendicular to an underside of the cage belt.

9. A cage strip of claim 8, wherein the leg extends additionally in direction of a space axis arranged perpendicular to an upper side of the cage belt.

10. A cage strip of claim 1, wherein the leg is connected through an articulation to one of: the spacer, the two cage belts, or the spacer and the two cage belts.

11. A cage strip of claim 10, wherein the articulation is formed by a film joint.

12. A cage strip of claim 10, wherein the articulation comprises an elastically deflectable web that is connected on one side to the leg and on another side to one of: the spacer, the two cage belts, or the spacer and the two cage belts.

13. A cage strip of claim 10, wherein the leg and the articulation are integrally connected to each other.

14. A cage strip of claim 10, wherein the leg and the articulation are integrally connected to one of: the spacer, the two cage belts, or the spacer and the two cage belts.

15. A cage strip of claim 10, wherein the leg itself is flexible.

16. A cage strip of claim 15, wherein the leg is thin-walled and made of plastic.

17. A cage strip of claim 1, wherein, at a level of the cage belt, the leg comprises a projection that forms a part of the contact surface.

* * * * *